F. L. WALTER.
GAGE.
APPLICATION FILED NOV. 14, 1918.
1,364,534.
Patented Jan. 4, 1921.
2 SHEETS—SHEET 1.
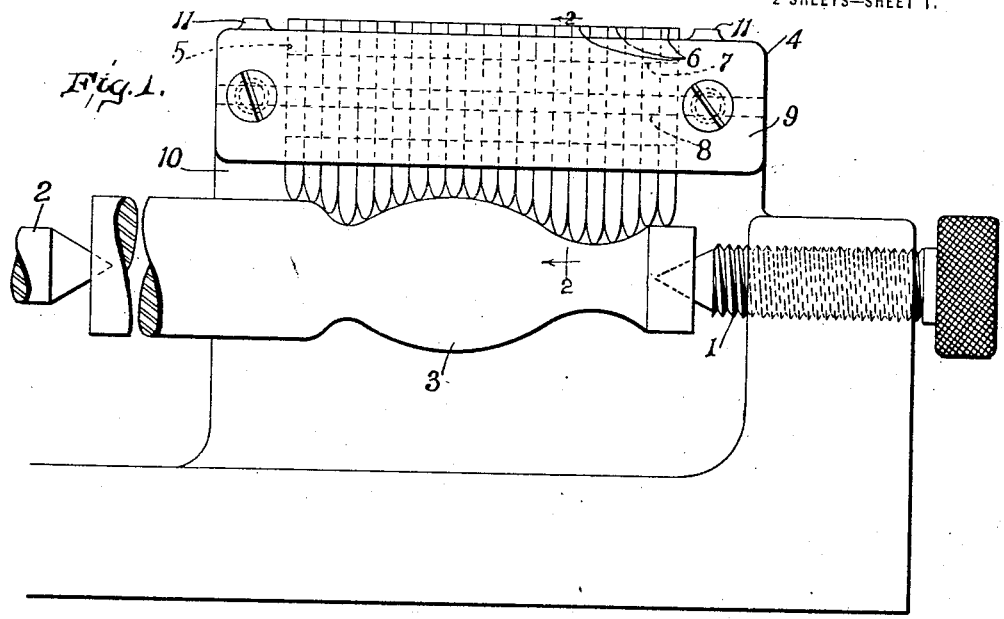
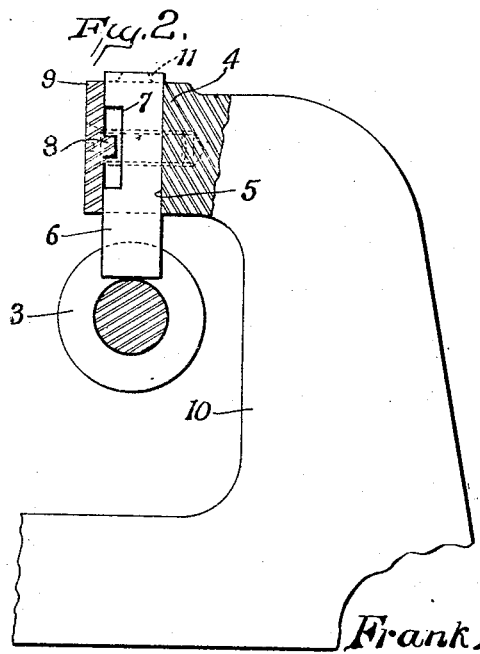
Inventor
Frank L. Walter,
By Edward L. Reed
Attorney

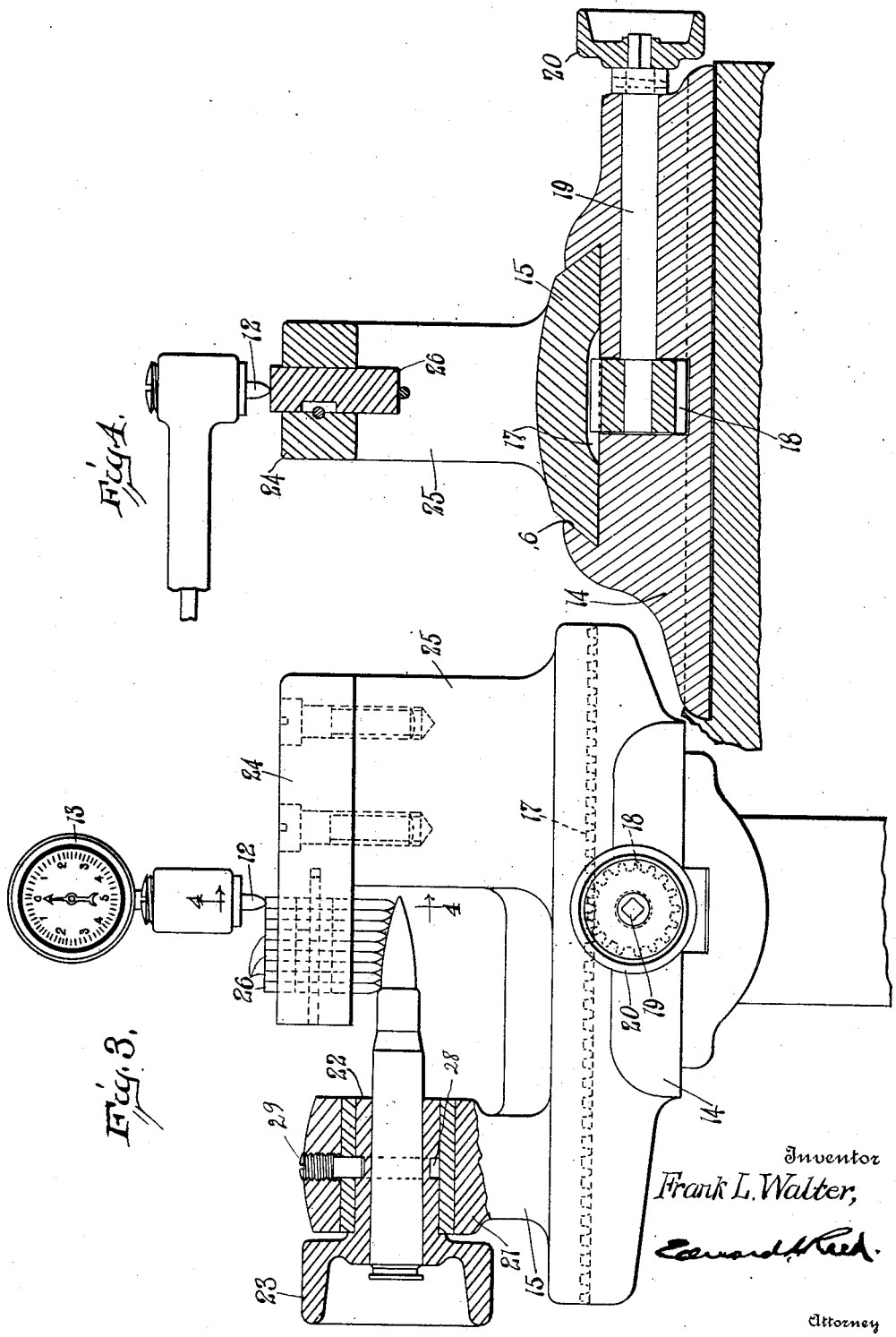

UNITED STATES PATENT OFFICE.

FRANK L. WALTER, OF DAYTON, OHIO.

GAGE.

1,364,534.	Specification of Letters Patent.	Patented Jan. 4, 1921.

Application filed November 14, 1918. Serial No. 262,419.

*To all whom it may concern:*

Be it known that I, FRANK L. WALTER, a citizen of the United States, residing at Dayton, in the county of Montgomery and State of Ohio, have invented certain new and useful Improvements in Gages, of which the following is a specification, reference being had therein to the accompanying drawing.

This invention relates to gages and more particularly to a gage for measuring contours or irregular surfaces. The object of the invention is to provide a gage by means of which it can be easily and quickly determined whether or not the surface of a given article is correctly shaped.

Further, to provide such a gage in combination with a work-supporting device whereby the size of the article, as well as its contour, can be measured.

It is also an object of the invention to provide such a gage in combination with an indicator which will indicate any variation of the article to be measured from the true shape and the amount of that variation.

Figure 1 is a front elevation of a device embodying my invention; Fig. 2 is an end elevation thereof partly in section; Fig. 3 is a front elevation partly in section of a modified form of the device; and Fig. 4 is a section taken on the line 4—4 of Fig. 3.

In carrying out the invention I provide a series of measuring elements which are mounted for independent movement relatively one to the other and which are of such relative length that when the contact points of said elements are in engagement with a surface of a predetermined shape, the opposite ends of the said elements will occupy certain predetermined positions relatively one to the other.

In the accompanying drawings I have illustrated two embodiments of the invention, in both of which the gage is designed for measuring articles which are circular in cross section and which may be rotated about a longitudinal axis to bring the different parts of their surfaces into engagement with the contact points of the measuring elements. It will be obvious, however, that the invention can be utilized, with little or no modification, for measuring articles of various kinds and shapes and that the kind of movement imparted to an article to bring the different parts of the surface to be measured into engagement with the contact points of the measuring elements will depend, to a large extent, upon the character of the article.

Devices of various kinds may be employed to indicate the relative positions of the measuring elements when their contact points are in engagement with the surface to be measured, or the eye alone may be relied upon for that purpose, depending upon the degree of accuracy required.

In Figs. 1 and 2 of the drawings I have illustrated the invention in connection with a pair of testing centers 1 and 2 which support the work, or article to be measured, 3, between them in an ordinary manner and which may be actuated to rotate the work about a longitudinal axis. In this arrangement the gage is mounted in a fixed position with relation to the testing centers so that it will measure the diameter of the article as well as the contour of its surface. As here shown, the gage comprises a supporting structure 4 having therein a transverse guideway 5 in which is mounted a series of measuring elements 6. The measuring elements may take various forms but, preferably, they are of a relatively long thin construction and they are here shown in the form of flat bars having their work-engaging ends more or less pointed. The guideway in the supporting structure 4, as here shown, is continuous and the several measuring elements are mounted in that guideway in contact one with the other, but they fit within the guideway with sufficient looseness to permit each element to have longitudinal reciprocatory movement independently of the other elements and relatively thereto. Any suitable means may be provided to limit the movement of the measuring elements and prevent their escape from the guideway. In the present construction each measuring element or bar 6 is provided in one edge with an elongated recess 7 into which extends a rib 8 carried by a plate 9 which forms a part of the supporting structure and constitutes the front wall of the guideway. As has been stated, the gage is, in the present instance, mounted in fixed relation to the testing centers 1 and 2 and, to this end the supporting structure 4 is carried by, and in the present instance formed integral with, a bracket 10, which is rigidly secured to the base in which the testing centers are mounted so that the supporting structure for the measuring elements will occupy a fixed relation to the testing centers and, consequently, to the work or article to be measured, which is mounted in the testing centers. When the article is mounted on the testing centers that portion of the surface thereof which is to be measured is brought into contact with the lower ends, or contact points, of the several measuring elements, and these elements are shifted longitudinally by their contact with said article. The lengths of the several measuring elements relatively one to the other are such that when the article with which their contact points are in contact is true to shape, the opposite or upper ends of the measuring elements will occupy predetermined positions with relation one to the other. Preferably, but not necessarily, the upper ends of the measuring elements are moved into a common plane. In that form of the device here illustrated, the measuring elements are arranged in a straight line and their upper ends are adapted to be moved into a common plane, and a straight edge may be applied to said upper ends thereof to determine whether or not all of said ends lie in the same plane. By rotating the article in the testing centers different parts of its surface will be brought into contact with the measuring elements and thus all portions of its circumference will be gaged. Further, the gage serves to test the concentricity of an article mounted in the centers as well as to gage the contour of its surface. Where it is desired to gage the article for size, or diameter, as well as for the contour of its surface, this may be accomplished by providing the supporting structure 4 with fixed parts on which the straight edge or other testing device may be supported. In the present device the supporting structure is provided at each end with lugs or pads 11 which are so arranged that when an article of correct size and surface contour is in the testing centers the straight edge will be in contact with both pads 11 and with the upper end of each measuring element. It will be understood, of course, that the straight edge is merely a gaging bar, the edge of which is straight to adapt it to the present arrangement of the measuring elements, and that the edge of the gaging bar may be of any shape which will accommodate it to the particular arrangement of measuring elements which may be employed.

Under certain conditions it is desirable to provide means whereby the amount of variation of an article from true shape may be indicated. In the manufacture of many articles a certain tolerance is permitted and if the surface does not vary from the true shape more than the amount of this tolerance it is passed. To provide an indication of this kind I have, in Figs. 3 and 4, shown the gage in combination with an amplifying gage such as is shown and described in the application for patent filed by me August 23d, 1917, Serial No. 187,753. This amplifying gage comprises a work-engaging member 12 which is connected by means of suitable amplifying devices with an indicator 13. In combining the contour gage with the amplifying gage, I have provided the latter with a platen or work-supporting table 14 upon which is mounted a supporting frame or carriage 15 for the work and the contour gage. This carriage is preferably mounted on the table 14 for movement transversely thereof, and it is here shown as having its lower end fitted within a dove-tailed groove 16 formed in the table 14. In order that reciprocatory movement may be easily imparted to the carriage the dove-tailed portion thereof is provided with teeth 17 with which meshes a pinion 18 mounted on a shaft 19 journaled in the table 14 and having on its outer end a hand wheel 20 by means of which the pinion may be rotated and reciprocatory movement imparted to the carriage 15. The carriage 15 is provided with means for supporting the work in a fixed position with relation thereto and, in the form here shown, a bracket 21 is mounted on the carriage near one end thereof and has rotatably mounted therein a hollow spindle 22 adapted to receive and rotatably support the work and having at its outer end a milled head 23 by means of which it may be rotated. The hollow spindle 22 is provided with a circumferential groove 28 into which extends the end of the pin 29 screw-threaded into the wall of the bearing bracket 21. This construction permits the spindle to rotate freely, but holds the same against axial movement. In the present instance, the work or article to be gaged is shown as a cartridge, the bullet in which is to be gaged and, therefore, extends beyond the work-supporting spindle. The contour gage is similar to that of Figs. 1 and 2 and comprises a supporting structure 24 mounted upon a bracket 25 secured to the carriage 15, and having mounted therein a series of measuring elements 26 arranged as described. That portion of the supporting structure in which the measuring elements are mounted extends beyond the bracket 25 and overhangs the work or article to be gaged so that the lower ends of the measuring elements can engage the surface of the work. The supporting structure 24 is so arranged with relation to the work-engaging member 12 of the amplifying gage that when reciprocatory movement is imparted to the carriage 15 all of the measuring elements 26 will be caused to move beneath and transversely to the work-engaging member. The supporting structure 24 of the contour gage and the work-engaging element 12 of the amplifying gage are so arranged with relation one to the other that when any one of the measuring elements 26 is in contact with an article of correct size and shape and with the needle of the indicator 13 the latter will be at zero. Consequently, by manipulating the carriage to bring the several measuring elements successively into contact with the work-engaging member, the shape of each successive part of the work will be indicated on the gage 13.

The operation of the gage will be readily understood from the foregoing description thereof and it will be apparent that I have provided a very simple inexpensive structure, by means of which the contour of a surface can be quickly and easily determined; and that this device can be combined with other indicating devices to determine whether or not each measuring element is in its correct position and the amount of variation from that correct position. While I have shown and described a certain arrangement of the several measuring elements, it will be understood that this arrangement may be varied to accommodate the device to work of different kinds, and further, it will be understood that while I have shown the measuring elements as mounted for vertical movement and as moved into engagement with the work by gravity, neither feature is essential to the operation of the gage and that the terms "upper ends" and "lower ends" as applied to the measuring elements in the specification and claims are used in a relative sense only, and are not intended as limitations.

While I have shown and described certain embodiments of the invention, I wish it to be understood that I do not desire to be limited to the details thereof, as various modifications will occur to a person skilled in the art.

Having now fully described my invention, what I claim as new and desire to secure by Letters Patent is:

1. In a gage, a supporting structure having a guideway, parts carried by said structure at the ends of said guideway to support a gaging bar in a position above and spaced from said guideway, a plurality of measuring elements mounted in said guideway for longitudinal movement relatively one to the other, said measuring elements being of such relative lengths that when their upper ends are in engagement with said gaging bar, while the latter rests upon said parts, the lower ends of said measuring elements will conform to the contour of the article to be gaged.

2. In a gage, a supporting structure having a guideway and a plurality of measuring elements movably mounted in said guideway and projecting above and below the same, said measuring elements being of such lengths relatively one to the other that when their upper ends are in a common plane their lower ends will conform to the contour of a surface to be gaged.

3. The combination with an indicating device comprising an indicator and a work-engaging member operatively connected with said indicator, of a work-supporting device and a gage comprising a supporting structure mounted in fixed relation to said work-supporting device, a plurality of measuring elements movably mounted on said supporting structure and arranged to engage the work carried by said work-supporting device, and means for causing said measuring elements to be brought successively into contact with the work-engaging member of said indicating device.

4. The combination with an indicating device comprising an indicator and a work-engaging member operatively connected with said indicator, of a work-supporting device, a gage comprising a supporting structure mounted in fixed relation to said work-supporting device, a plurality of work-engaging elements movably mounted in said supporting structure, each having its lower end adapted to engage the work carried by said work-supporting device, and means for imparting bodily movement to said work-supporting device and said gage to cause the upper ends of said measuring elements to be brought successively into contact with the work-engaging member of said indicating device while said measuring elements are in contact with the work carried by said work-supporting device.

5. The combination with an indicator comprising an indicating device, a work-engaging member operatively connected with said indicating device, and a supporting table arranged beneath said work-engaging member, of a carriage mounted for reciprocatory movement on said table, a work-supporting device mounted on said carriage, a gage mounted on said carriage and comprising a supporting structure mounted in fixed relation to said work-supporting device, a plurality of measuring elements mounted for relative longitudinal movement on said supporting structure and each having one end adapted to engage the work carried by said work-supporting device, and means for imparting reciprocatory movement to said carriage to cause the other ends of said measuring elements to be brought successively into engagement with the work-engaging member of said indicating device.

6. The combination with an indicator comprising an indicating device, a work-engaging member operatively connected with said indicating device, and a supporting table arranged beneath said work-engaging member, of a carriage mounted for reciprocatory movement on said table, a work-supporting device mounted on said carriage, a gage mounted on said carriage and comprising a supporting structure mounted in fixed relation to said work-supporting device, a plurality of measuring elements mounted for relative longitudinal movement on said supporting structure and each having one end adapted to engage the work carried by said work-supporting device, said carriage having teeth, a shaft mounted in said table, a pinion carried by said shaft and meshing with the teeth of said carriage, and means for rotating said shaft to impart movement to said carriage and cause the other ends of said measuring elements to be brought successively into engagement with the work-engaging member of said indicating device.

7. In a gage, a supporting structure, a plurality of measuring elements slidably mounted on said structure and each having one end adapted to engage an article to be gaged, and means to rotatably support said article on an axis fixed with relation to said structure, each of said measuring elements having its other end arranged to be moved into a predetermined position with relation to the corresponding ends of the other elements when the first mentioned ends of said elements are caused to engage an article of predetermined shape and size on said rotatable supporting means.

8. In a gage, a supporting structure, a plurality of measuring elements movably mounted on said structure and each having one end adapted to engage an article to be gaged, and means to rotatably support said article on an axis fixed with relation to said structure, said measuring elements having their other ends arranged to be moved into a common plane when the first mentioned ends are caused to engage an article of predetermined size and shape on said rotatable supporting means.

In testimony whereof, I affix my signature hereto.

FRANK L. WALTER.